3,387,454
POSITIVE TRANSMISSION NEUTRAL
CONTROL MECHANISM
Leonard Padleckas, Clarendon Hills, Ill., assignor to International Harvester Company, Chicago, Ill., a corporation of Delaware
Filed Oct. 27, 1966, Ser. No. 589,895
8 Claims. (Cl. 60—53)

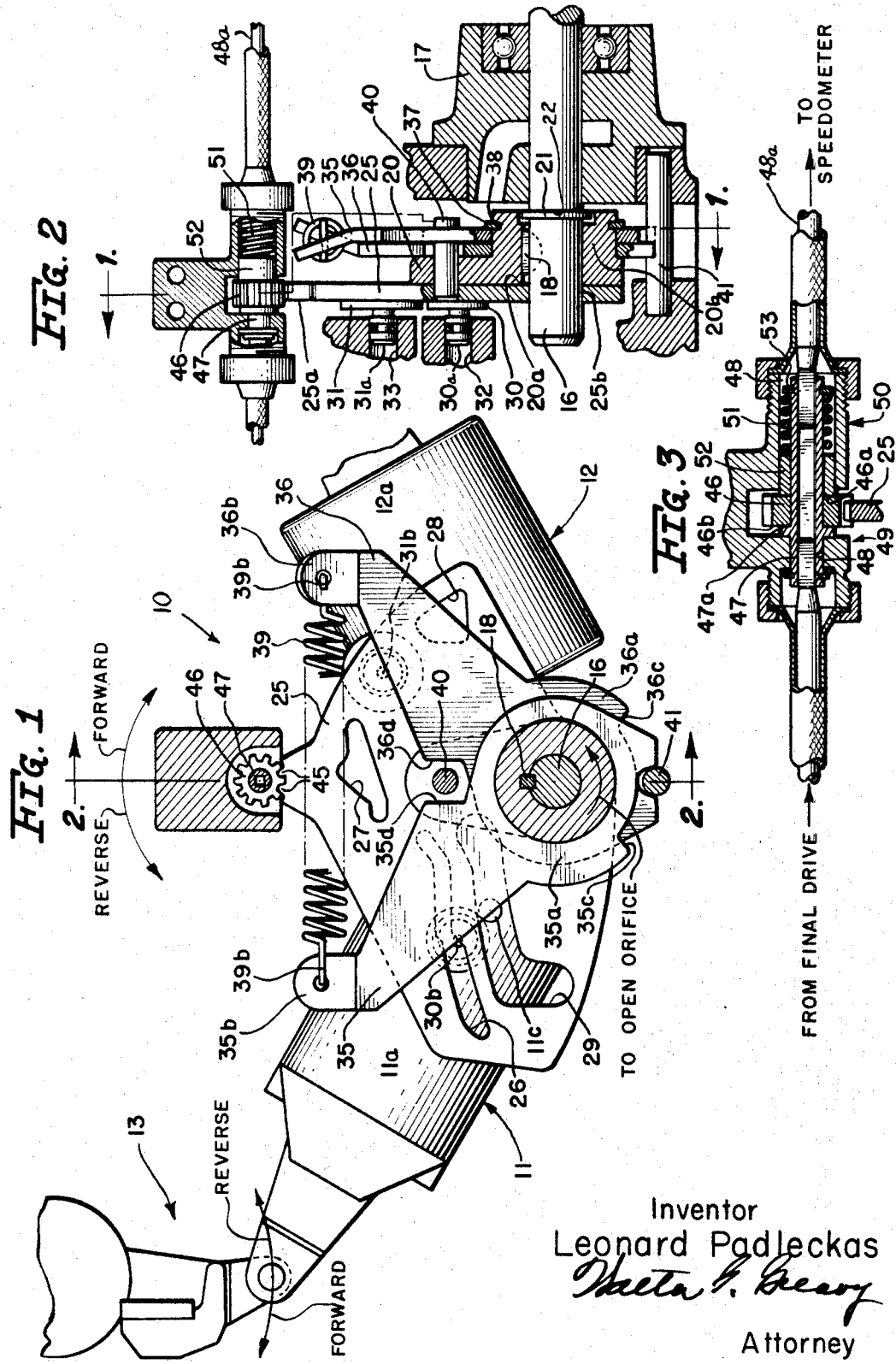

This invention pertains to a mechanism for controlling hydraulic power transmissions, including what are termed reversible hydrostatic transmissions and more specifically to a mechanism for attaining and maintaining control of such a transmission in neutral position.

The problem of "creep" in these transmissions is an old one and various means have been devised to meet it as illustrated in United States Letters Patent No. 3,119,478 of Jan. 28, 1964; No. 2,973,070 to Firth of Feb. 28, 1961; No. 2,966,244 to Schreyer of Dec. 27, 1960; and the references cited in connection therewith; also co-pending U.S. patent application Ser. No. 562,611 of Frank R. Catuara and others.

A principal object of the present invention is to provide an improved, simple and novel mechanism for operating the swash plate servo control of a hydrostatic transmission automatically to establish and maintain a neutral position thereof positively inhibiting creep of the vehicle.

A further object is to provide means in a mechanism of the type described in the above-mentioned Catuara application operable under manual control automatically to establish and maintain a positive neutral position of the transmission.

Another object is to provide, in a control mechanism of a hydrostatic transmission including cam plate valve porting means, means coordinated with the transmission output means to operate the cam plate from an approximate, to a positive neutral position.

An additional object is to provide in a hydrostatic transmission having cam plate valve porting means for controlling hydraulic servo mechanisms operative for adjustably rotating swash plates of the transmission in opposite directions from a neutral position in addition to a pair of levers rotatably mounted co-axially with said cam plate and servo mechanisms and yieldably biased toward one another and selectively engageable with said cam plate for returning the plate to a position in which the transmission is conditioned for neutral operation upon release of the actuating torque causing displacement of the transmission away from a neutral position, means coordinated with the transmission output shaft, and including slip clutch means operable under manual control to activate the cam plate and said levers from an approximate neutral position to a positive neutral position and so cause the requisite swash plate adjustment effectively cutting off the application of hydrostatic pressure to the transmission, and preventing "creep" of the vehicle.

Included among the objects of the invention also is the provision, in means of the character stated, of positive drive means for transmitting power from the transmission output shaft to the cam plate and slip clutch means associated therewith and operable under manual control to activate the cam plate and the levers, from a position causing the establishment of the transmission in approximately neutral position to a position causing the establishment of the transmission in positive neutral position, thereby preventing "creep" of the vehicle, said positive drive means comprising gear teeth on the cam plate engageable in a predetermined condition of operation upon manual shift of the transmission control lever to neutral position with teeth of a gear mounted for relative rotation on a shaft driven from the transmission output shaft but releasably held against relative rotation by spring pressed means in the nature of a slip clutch which is overruled when, upon such engagement of the gear teeth with the teeth of the gear, the cam plate is shifted from an approximately neutral position resulting from said manual shift of the transmission control lever to a positive neutral position.

These and other objects, features and advantages of the invention will appear as the description of a preferred embodiment thereof proceeds in the light of the accompanying drawings in which:

FIG. 1 is a partially schematic and elevational view partially in section of an adaptation of the invention to a hydrostatic transmission, as indicated in FIG. 2, FIG. 2 is vertical, partially sectional view taken generally along the line 2—2 of FIG. 1, FIG. 3 is an enlarged sectional detail of a portion of the invention shown in FIG. 2.

Referring to the drawings the preferred embodiment of the invention illustrated therein is depicted in relation to control mechanism for a hydrostatic transmission such as is often used for propelling a vehicle and including (not shown) a pump unit and a motor unit, each of which is operatively controlled by means of a swash plate operated by a servo motor, operatively arranged and connected with a source of fluid under pressure, in well-understood manner.

In the present arrangement, as illustrated in FIG. 1, the overall structure 10 comprises two servo motors 11, 12, respectively operatively connected with such swash plates for forward and reverse operation as schematically indicated as to the swash plate of a pump unit by numeral 13.

The servo motors 11, 12 comprise hydraulically actuated extendable and contractable servo cylinders, 11a, 12a, respectively anchored at one end on a suitably supported mounting pin or stub shaft (not shown) which is co-axially aligned with shaft 16 and supported by the transmission housing. The latter shaft is suitably journalled in a bearing 17 also supported by the transmission housing and is rotatable in conventional manner by a transmission operating lever (not shown) connected with actuating means such as a foot pedal or hand lever.

The components of the pump and motor units, including swash plates and operating means associated therewith generally, as in the structure of the cited Catuara application, are arranged in a manner similar to that shown and described in United States Letters Patent No. 3,126,707 to M. M. Hann et al.

In the preferred embodiment of the present invention, a hub-like back-up plate member 20 is mounted on shaft 16 for rotation therewith, as by splining with key 18. Movement of member 20 axially of shaft 16 in one direction is limited by means of a snap-ring 21 seated in an annular recess 22 provided in shaft 16.

A generally flat cam plate 25 provided with a suitable bore 25b also is mounted on shaft 16, in juxtaposition and in secured relation (as means of rivets or welding) with one face 20a of member 20, for rotation therewith. Member 20 and plate 25 might be formed integrally, if desired.

Plate 25 is of irregular outline (FIG. 1) for reasons which will appear. Valve porting slots 26, 27 and 28 are provided therein in predetermined space relation with the axis of shaft 16 and member 20 and conformed and arranged to control the flow of fluid under pressure from outlets of cylinders 11 and 12, respectively. Cam slot 29 also is provided in plate 25 for receiving a guide pin 11c fixed on cylinder 11a.

An exposed face 25a of plate 25 is arranged for slidable engagement with a pair of button-like valve seat members 30, 31 which have stem-like portions 30a, 31a projecting rectilinearly therefrom and adapted to be received in fluid outlets 32, 33 of cylinders 11a, 12a.

Central longitudinally extending openings 30b, 31b in valve seat members 30, 31 provide ports for communicating with the interior of cylinders 11a, 12a. It will be noted that members 30, 31 are disposed for cooperative positioning respectively with slots 26, 27 and 28, which, in various position of plate 25 coincident with rotation of shaft 16, function to cover and uncover the port openings or outlets 32, 33 of the servo cylinders 11a, 12a to effect the extension or contraction thereof as desired to control the associated swash plates of the transmission.

The foregoing description corresponds generally with the disclosure of the previously cited Hann patent. The operation of the pump-motor unit, as before indicated is generally conventional, with swash plates of the respective pump and motor elements being rotatable in opposite directions from a neutral center position for adjusting the displacement of their respective components between minimum and maximum stroke thereof thus correspondingly to vary (a) the transmission of power therebetween, (b) the relative speeds of the input and output shafts, and (c) the direction of rotation of the output shaft.

As in the control mechanism of the cited Catuara application the present invention further provides an arrangement of a pair of scissor-like levers 35, 36 in association with the cam plate 25 and other means to correlate the port openings of the servo cylinders 11a, 12a and the respective cam plate slots 26, 27 and 28 so as to maintain the associated swash plates in positions corresponding to the neutral position of the transmission.

The levers 35, 36, generally similar in conformation, are journalled adjacent one end thereof on hub portion 20b of back-up plate member 20 in abutting relation with plate 25, for relative rotation, in opposition to one another. The levers are held against axial displacement by means of a snap ring 37 positioned in an annular recess 38 provided on hub portion 20b.

Levers 35, 36 are formed with body portions 35a, 36a and arms 35b, 36b, with recesses 35c, 36c having oppositely facing and substantially radially extending wall portions, and shoulder abutments 35d, 36d provided in the respective body portions 35a, 36a. A coil spring 39, having shaped ends 39b, 39b anchored in openings in arms 35b, 36b, and positioned and arranged for tension constantly biasing the arms toward one another.

A displacement stop or abutment member in the form of a pin 40 limiting movement of arms 35b, 36b toward one another under bias of spring 39 is fixedly mounted in plate 25 and member 20 and arranged to extend axially intermediately of shoulder abutments 35d, 36d. The present invention departs from the disclosure of the cited Catuara application in providing a modicum of play between pin 40 and the shoulder abutments, as illustrated in FIG. 1. This provision is made for the purpose of enabling an adjustment of cam plate 25 first to an approximate neutral position and thence to a positive neutral position thereby to effectuate a corresponding position of the transmission, as will appear.

A second pin 41 is suitably mounted in the transmission housing and extends intermediately of the recesses 35c, 36c in position contacting adjacent radially extending wall portions of those recesses when the transmission is in the neutral position.

Levers 35, 36, cam plate 25, and their associated parts are so disposed and arranged to operate that, as illustrated in FIG. 1, rotation of cam plate 25 will always cause a selective corresponding rotation of one of the levers 35, 36, since as plate 25 rotates in one direction pin 40 engages one of the shoulder abutments 35d, 36d and in the opposite direction engages the other of said abutments, thus always carrying with it one or the other of said levers.

It will be particularly noted that upon rotation of shaft 16 to the position corresponding to neutral position of the speed control handle or pedal, lever 36 is rotated to the position of FIG. 1 in which further rotation is prevented by pin 41. Concurrently shoulder 36d and pin 40 cooperate to rotate plate 25 to approximate neutral position.

Further correlation of the movement of the components described is provided by the camming of follower pin 11c carried by pump servo cylinder 11a and extending into slot 29 in well-known manner, as will be noted.

Considering the structure thus described with the transmission in neutral position and the control components in operative relation as illustrated in FIG. 1, it will be seen that outlet port 31b of servo cylinder 12 is disposed between slots 27 and 28 and is covered, and so closed, by cam plate 25, as is normal for this condition of the transmission. Cylinder 12 is thus extended to produce a maximum stroke condition of the motor. Port 30b of cylinder 11a, on the other hand being disposed in alignment with an edge of slot 26, is but partially covered by plate 25, and so remains, partially open.

In this neutral position of the transmission spring 39 urges shoulder abutments 35d, 36d toward pin 40 while the radially extending walls of recesses 35c, 36c are brought into opposing relation with pin 41. It will, of course, be understood that in this situation shaft 16 is in inactive or neutral position, actuating force having been withdrawn from the control lever therefor upon shift of the transmission to the neutral position.

Operation of cam plate 25 and levers 35, 36 in the opening and closing of the respective valve ports and the correlation of movement effected through the camming of pin 11c in slot 29 upon rotation of shaft 16, adequately described in the cited Catuara application, need not be described again here. That description is to be considered as incorporated here.

As previously indicated the present invention is intended to carry forward the Catuara structure by providing mechanism effective to render the neutral position of the transmission positive in the sense of inhibiting troublesome "creep." To this end the cam plate 25 is operatively related to the output shaft of the transmission in a manner assuring requisite operation of the appropriate valve port.

Accordingly gear teeth 45 are provided on an outstanding peripheral portion of cam plate 25 in position for meshing engagement in certain conditions of operation with corresponding teeth of a gear 46. The latter gear is mounted on a shaft 47 in freely rotatable relation therewith.

Shaft 47 is journalled in bearings 48, 48 arranged in an auxiliary housing 49 supported by the transmission housing. It will be noted, as illustrated in FIG. 1 reflecting the neutral position of the transmission, that the axes of shafts 47 and 16 and pins 40, 41 are disposed in generally horizontal, parallel spaced relation with one another and in a common vertical plane.

Shaft 47 is operatively connected with a power take-off from the transmission output shaft or final drive reflecting the speed of the latter—as shown in FIGS. 1, 2 the speedometer cable 48a—for rotation correspondingly therewith. Thus whatever the speed of rotation or r.p.m. of the final drive of the transmission whether fast or slow, e.g., creeping, shaft 47 rotates at a directly proportional speed.

A slip-clutch 50 is arranged on shaft 47 for rotation therewith and comprises a coil spring 51, a thrust member 52 intermediately of a face 46a of gear 46 and an abutment member carried on the shaft 47, e.g., a collar 53, and a shoulder 47a on shaft 47 in abutting relation with the opposite face 46b of gear 46. Slip-clutch 50 operates through friction normally to cause gear 46 to rotate with shaft 47, spring 51 exerting sufficient thrust for the purpose; but yielding to spring 39 in certain conditions of operation.

Since as previously indicated cam plate 25 occupies the position of FIG. 1 only when the transmission is in neutral position, being rotated to the left or to the right when other transmission positions obtain, teeth 45 will be rotated correspondingly. And as meshing engagement of teeth 45 with teeth of gear 46 is desired only for the purpose of attaining and maintaining positive neutral position of the transmission, teeth 45 are so conformed and disposed as to be engageable with teeth of gear 46 only upon shift of the transmission to neutral when shaft 16 is correspondingly rotated.

To assure smooth, efficient functioning of the transmission and vehicle performance teeth 45, gear 46, shaft 47, clutch 50, and the parts associated with them are so conformed and arranged to operate that upon shift of the transmission to neutral position when the vehicle motor is running, cam plate 25 rotates to an approximately neutral position as illustrated in FIG. 1. Thereupon teeth 45 mesh with teeth of gear 46, causing cam plate 25 to be further rotated to a position bringing pin 40 into abutment with one or the other of the shoulders 35d, 36d depending upon the direction of movement of the vehicle, whereupon rotation of both cam plate 25 and gear 46 ceases, and spring 39 overcoming spring 51, thus establishing the cam plate in positive neutral position, and causing actuation of lever 35 and consequent further adjustment of the cylinder 11a and the swash plate of the pump unit in position establishing the transmission in positive neutral position.

Such position of the transmission having been established, it will be appreciated that creeping of the vehicle due to gravity, for example, incident to parking on an inclined, rotation of gear 46 in response thereto, reflecting as it does the final output of the transmission, automatically will cause corresponding rotation of cam plate 25 countering the tendency to creep.

It will be understood that changes of form and structure, including reversal of parts, substitution of equivalents, and other modification, may be made without departing from the spirit, substance and scope of the invention.

I claim:

1. In a control assembly, for a hydraulic power transmission in operative communication with a source of fluid under pressure and having pump and motor units, and comprising in operative relation
   (1) swash plates respectively associated with said units and adjustable to vary the condition of the transmission, selectively to establish neutral, forward and reverse positions thereof,
   (2) servo mechanisms, including hydraulic cylinders operative so to adjust said swash plates,
   (3) means comprising valve ports operative to control the flow of fluid under pressure to and from said cylinders for actuating said servo mechanisms,
   (4) a cam plate comprising cam means and correlatively operable valve porting slots operative from a neutral center position to open and close said ports whereby correspondingly to actuate said servo mechanisms and adjust said swash plates,
   (5) means yieldingly biasing said cam plate in the neutral center position,
   (6) means operable upon application of an external force to actuate said cam plate to selected positions of operation, including an approximate neutral position,
   (7) and means arranged in co-operative relation with said biasing means and said cam plate for maintaining the latter in positive neutral position,
   (8) a sub-assembly comprising
       (a) first clutch means carried by said cam plate,
       (b) second clutch means,
       (c) linkage including slip-clutch means operatively interconnecting said second clutch means and the final output of the transmission,
   said first and second clutch means being interengageable to establish a positive interconnection therebetween upon actuation of said cam plate to approximate neutral position, and said slip-clutch means being correspondingly overruled upon the interengagement of said first and second clutch means, said sub-assembly and the parts thereof being so conformed and arranged to operate in relation to one another and to the other components of said control assembly that, upon said cam plate being operated to approximate neutral position said control assembly will operate automatically to establish said cam plate and said transmission in positive neutral position.

2. The invention according to claim 1 in which
   (a) the means yieldably biasing said cam plate in the neutral center position comprises lever means mounted for limited pivotal movement in opposite directions from a neutral center position and engageable with said cam plate for selective movement in opposite directions therewith, said lever means being spring biased toward a neutral center position and operative, upon release of the external force, to urge said cam plate to an approximately neutral position,
   (b) the cam means comprise cam slots arranged in predetermined space relation in the cam plate and in operative relation with said valve ports respectively,
   (c) the clutch means carried by the cam plate comprise gear teeth carried on a peripheral extension of the cam plate,
   (d) the clutch means interengageable therewith comprise teeth of a gear journalled on a drive shaft in direct drive relation with the final output of the transmission,
   (e) the cam plate and the gear having axes of rotation disposed in predetermined space relation with one another,
   (f) the slip-clutch means comprise means carried by the drive shaft restricting displacement of said gear axially of said shaft in one direction and said spring means function in opposition thereto, said spring means being overruled upon shift of the cam plate establishing approximate neutral position of the cam means,
   (g) and the arrangement of parts is such that upon manual shift of the cam plate to approximate neutral position, the teeth of the cam plate will mesh with corresponding teeth of the gear whereupon the cam plate will rotate correspondingly to adjust said cam means in relation to said ports whereby to establish positive neutral position of the transmission.

3. A sub-assembly as defined in claim 1 in which one of the servo mechanisms includes a hydraulic cylinder operative to adjust the swash plates associated with the pump unit, said cylinder having an outlet opening in communication with the hydraulic system and so disposed and arranged in relation to the cam plate and one of the valve porting slots thereof that shift of the cam plate to approximate neutral center position, will result in subsequent rotation of the cam plate to positive neutral center position.

4. In a control assembly for a reversible hydrostatic transmission including variable displacement swash plate pump and motor units in operative communication with a hydrostatic system and comprising in operative relation,
   (1) swash plates respectively associated with said units and adjustable to vary the displacement thereof,
   (2) servo mechanisms, including hydraulic cylinders in communication with said system, and operative so to adjust said swash plates,
   (3) a cam plate pivotally movable in opposite directions from a neutral center position and having separate portions comprising means operable independently to control displacement of the pump, and the motor, on movement in either direction from the neutral center position, (4) actuating means associated with said cam plate means and operable upon application of an external force to pivot said cam plate to selected positions of adjustment in opposite directions from a neutral center position, including approximate neutral position, (5) lever means pivotally mounted for limited movement in opposite directions from a neutral center position and engageable with said cam plate for selective movement in opposite directions therewith, (6) resilient means connected with said lever means normally to urge the latter means toward a neutral center position and, upon release of the external force, to urge said cam plate to a neutral center position, (7) and means arranged in cooperative relation with said lever means, said resilient means and said cam plate for maintaining the latter in positive neutral position, a sub-assembly comprising
(a) first clutch means carried by said cam plate,
(b) second clutch means,
(c) linkage including slip-clutch means interconnecting said second clutch means and the final output of the transmission,
said first and second clutch means being interengageable to establish a positive interconnection therebetween upon actuation of said cam plate to approximate neutral center position, and said slip-clutch means being correspondingly overruled upon the interengagement of said first and second clutch means, said sub-assembly and the parts thereof being so conformed and arranged to operate in relation to one another and to the other components of said control assembly that, upon said cam plate being operated to approximate neutral position said control assembly will operate automatically to establish said cam plate and said transmission in positive neutral position.

5. The invention according to claim 4 in which the first clutch means comprise gear teeth carried on a peripheral extension of the cam plate and the second clutch means comprise teeth of a gear journalled on a drive shaft in direct drive relation with the final output of the transmission, the cam plate and the gear having axes of rotation disposed in predetermined space relation with one another, and said first and second clutch means being so arrange that upon shift of the cam plate to approximate neutral position the teeth of the cam plate will mesh with corresponding teeth of the gear whereupon the cam plate will rotate correspondingly to a positive neutral position.

6. The invention according to claim 5 in which the drive shaft is arranged in operative relation with slip-clutch means including spring means normally biasing the gear of the second clutch means for rotation with said drive shaft and being overruled upon shift of the cam plate to approximate neutral position.

7. The invention according to claim 6 in which the slip-clutch means comprise a first stop means carried by the drive shaft and restricting displacement of the gear axially of said shaft in one direction, and spring means in association with second stop means carried by the drive shaft in spaced relation with said first stop means and normally biasing said gear in braking frictional engagement with said first stop means, and being overruled upon the meshing of the teeth of the cam plate with the teeth of the gear.

8. The invention of claim 4 in which the separate portions of the cam plate comprising means operable independently to control displacement of the pump, and the motor, include cam means and correlatively operable valve porting slots operative in either direction from a neutral center position to open and close valve ports of the system thereby correspondingly to actuate the servo mechanisms and adjust the swash plates, and, upon application of an external force effective to actuate said cam plate to an approximate neutral position and thence to a positive neutral position, to adjust the swash plate of the pump unit to positive neutral position and so cause the establishment of the transmission in positive neutral position.

No references cited.

EDGAR W. GEOGHEGAN, *Primary Examiner.*